(12) United States Patent
Gaynor et al.

(10) Patent No.: US 7,498,981 B2
(45) Date of Patent: Mar. 3, 2009

(54) METHOD AND APPARATUS FOR REAL-TIME DIGITAL PROCESSING OF SATELLITE POSITIONAL SIGNALS FOR FAST ACQUISITION AND LOW SNR TRACKING

(75) Inventors: Brad David Gaynor, Brookline, MA (US); James Irons Donna, Watertown, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 513 days.

(21) Appl. No.: 11/246,494

(22) Filed: Oct. 7, 2005

(65) Prior Publication Data

US 2007/0242734 A1   Oct. 18, 2007

(51) Int. Cl.
  *G01S 5/14*  (2006.01)
  *H04B 1/69*  (2006.01)

(52) U.S. Cl. .................. 342/357.12; 375/150
(58) Field of Classification Search .......... 375/150; 342/357.12
  See application file for complete search history.

(56) References Cited

U.S. PATENT DOCUMENTS

| | | | |
|---|---|---|---|
| 5,459,473 A | 10/1995 | Dempster et al. | |
| 6,121,923 A | 9/2000 | King | |
| 6,188,351 B1 | 2/2001 | Bloebaum | |
| 6,208,291 B1 * | 3/2001 | Krasner | 342/357.12 |
| 6,295,024 B1 | 9/2001 | King et al. | |
| 6,300,899 B1 | 10/2001 | King | |
| 6,327,473 B1 | 12/2001 | Soliman et al. | |
| 6,546,040 B1 | 4/2003 | Eschenbach | |
| 6,606,346 B2 | 8/2003 | Abraham et al. | |
| 6,642,884 B2 | 11/2003 | Bryant et al. | |
| 6,731,672 B1 * | 5/2004 | Eschenbach | 375/140 |
| 6,750,814 B1 | 6/2004 | Nir et al. | |
| 6,775,319 B2 * | 8/2004 | King et al. | 375/150 |
| 6,795,771 B2 | 9/2004 | Fuchs et al. | |
| 6,850,557 B1 | 2/2005 | Gronemeyer | |
| 6,888,879 B1 | 5/2005 | Lennen | |
| 6,891,880 B2 | 5/2005 | Abraham | |
| 7,272,168 B2 * | 9/2007 | Akopian | 375/150 |

FOREIGN PATENT DOCUMENTS

WO  WO 2004036238 A1 *  4/2004

\* cited by examiner

*Primary Examiner*—Gregory C Issing
(74) *Attorney, Agent, or Firm*—Ropes & Gray LLP

(57) ABSTRACT

The invention relates to real-time processing of GPS signals, including correlation of the received signals with stored satellite C/A codes, including the accumulation of coherent data before a correlation score is calculated.

48 Claims, 12 Drawing Sheets

METHOD AND APPARATUS FOR REAL-TIME DIGITAL PROCESSING OF SATELLITE POSITIONAL SIGNALS FOR FAST ACQUISITION AND LOW SNR TRACKING

FIELD OF THE INVENTION

The invention generally relates to satellite positioning systems. More particularly, in various embodiments, the invention is directed to systems, methods, and devices providing improved acquisition and processing of positioning signals from satellites in low signal to noise ratio (SNR) environments.

BACKGROUND

The Global Positioning System (GPS) includes 24 satellites, orbiting the earth. Each travels in a precise orbit, approximately 11,000 miles above the earth's surface. A GPS receiver locks on to signals transmitted by at least 3 of the satellites, and using these signals is able to determine its precise location.

Each satellite transmits two spread spectrum carrier signals, L1 and L2. The L1 signal is centered on 1575.42 MHz, while the L2 signal is centered on 1227.60 MHz. The L1 signal, typically used for non-military applications, is modulated with a unique coarse/acquisition (C/A) pseudo-random noise (PRN) code and a precision (P) PRN code. Each C/A code is a sequence of 1023 chips, transmitted at 1.023 MHz (or 1023 chips per millisecond). L2, which is typically used for military applications, is modulated using only the P code. Each satellite typically periodically alternates between transmitting its C/A code and the inverse of its C/A code. Because each satellite uses a unique PRN code, a plurality of GPS satellite signals transmitted at the same frequency may be received and distinguished by a suitable GPS receiver.

The GPS receiver receives the L1, L2 and/or other signals from a particular satellite, and determines the distance from the particular satellite by determining the phase shift in the received PRN code (commonly referred to as the C/A or PRN code phase). The code phase is determined with respect to the delay in chips or fractions of chips that the satellite transmission experiences as it travels from the particular satellite to the receiver. The receiver determines the code phase by correlating shifted versions of the known C/A code for the particular satellite with the C/A code from the received signal. The shifted version that maximizes the degree of correlation with the received signal identifies the code phase. The receiver then calculates the time delay associated with the determined code phase. The distance from the receiver to the satellite may then be calculated by multiplying the time delay by the speed of the transmission (which equals the speed of light).

The GPS receiver knows the precise orbits of each of the satellites of the GPS. It uses this information to define a sphere around a satellite from which it has received a signal, with the radius of the sphere equal to the distance from the receiver to the satellite. The receiver may be located anywhere on the surface of this sphere. The receiver repeats this process for at least three satellites, resulting in definitions of three intersecting spheres. The surfaces of the three spheres can only intersect at two distinct points with known latitude, longitude, and altitude, one of which must be the receiver's location. Usually, one of the two distinct points can be ruled out by the receiver as an impossible location (e.g. a latitude, longitude, or altitude measurement that is not located on or near the earth's surface), resulting in the final determination of the receiver's location. Alternatively, a fourth satellite signal may be used to correct for timing uncertainties, thereby allowing the determination of the exact location of the GPS receiver.

The satellites continue to move around their orbits as their signals are transmitted. The signal received by a GPS receiver therefore changes with time, according to the movement of the satellite. This change, known as the Doppler Shift (DS), is the apparent change in the frequency of a signal caused by the relative movement between the satellite and the receiver. The frequency shift will be positive if the satellite and receiver are moving toward each other, and negative if the satellite and receiver are moving away from each other. GPS receivers must adjust the received signal to account for the change in frequency caused by the DS.

In addition to frequency changes caused by satellite movement, the frequency of the signal at the receiver can be affected by the movement of the receiver and by atmospheric differences. Thus, although the original signal is transmitted at the L1 frequency 1575.42 MHz, the frequency of the signal once it has reached the receiver may have changed by 4-5 kHz. Therefore the receiver may have to search over several frequencies to locate and lock on to the signal from a satellite.

Conventionally, the most accurate digital method for calculating location from satellite receivers is post-processing. This method requires the use of a buffer for storing received data. The buffer is processed after the data has been collected and stored, since data can be collected at a faster rate than it can be processed. Processing methods are variable, with a general purpose of correlating the data with stored C/A codes, in order to identify the particular satellite associated with each satellite signal, and calculate the code phase of each signal. From this information, the distance from the satellite may be computed as described above. Generally, greater amounts of collected data result in increased signal gain and more accurate processing results. However, the size of the memory buffer limits the amount of data that can be collected for processing. Large memory devices are more expensive and consume more power than small memory devices, while small memory devices limit amount of data that can be collected for processing, and thus the amount of possible gain on the search results, limiting usage in low signal to noise ratio (SNR) environments.

A second method used for satellite positioning system receivers involves parallel processing of collected signals. This requires hardware duplication in order to process multiple signals simultaneously. While this allows for real-time processing of multiple time delays, frequency bins, or satellites simultaneously, it also results in a significantly larger and more expensive device, with high energy consumption.

Both of these methods are limited in their effectiveness for use in portable devices, where both size and energy consumption are of paramount importance.

SUMMARY OF THE INVENTION

The invention, in various embodiments, addresses the key issues of size and energy consumption, while increasing gain for use in low SNR environments, as well as increasing processing speed for real-time or near real-time data processing. According to one aspect, this is achieved through a novel digital processing approach.

In one approach, the invention provides a GPS receiver receiving a spread spectrum signal, such as the L1 signal described above. The received signal may contain transmitted signals from several different satellites. L1 signals are transmitted at 1575.42 MHz from each satellite, however, frequency changes caused by, for example, the Doppler shift and local oscillator uncertainties may have altered the frequencies of the signals by 4-5 kHz. Thus, the GPS receiver may have to search over the frequency range of about 1575.415 MHz to about 1575.425 MHz, to find the transmitted signals within the received signal. This frequency range may be subdivided into an integer number of frequency bins, each of which may be searched for satellite signals. Thus, the process for detecting satellite signals described below may be repeated for each frequency bin searched.

According to one embodiment, an epoch of data of a received satellite signal is a sequence of digitized signal data of a given length that represents the identification code for a particular satellite. For example, in GPS satellite L1 signals, an epoch of data includes one-millisecond of data, i.e., the length of time a GPS satellite takes to transmit one period of its C/A code. One epoch therefore includes the 1023-chip sequence of the satellite's C/A code, which is the identification code, for that particular satellite. A GPS satellite typically transmits its C/A code continuously, from time to time (for example, every 20 milliseconds) sometimes switching between the C/A code and the inverse of the C/A code.

Depending on a receiver's digital sampling rate for a received L1 signal, the epoch of digitized signal data will include a number of data signal samples, or signal components, each of which might be considered to occupy one position in the epoch. For example, the receiver may sample the signal such that for each millisecond epoch, the receiver takes 1023 samples, resulting in 1023 signal components. Alternatively, the 1023-chip epoch of the L1 signal might be sampled at twice that rate, resulting in 2046 signal components. Each signal component is assigned an epoch position based on the order it is received. For example, the first signal component, corresponding to the first sample in a given millisecond signal epoch is assigned the first epoch position. The $100^{th}$ signal component is assigned the $100^{th}$ epoch position.

According to one embodiment, the invention attempts to identify from which of the GPS satellites the data was received by correlating the received signal for each frequency bin searched with stored C/A codes associated with each of the satellites. Obtaining a high correlation between the signal and one of the C/A codes both identifies the particular satellite from which the signal was received and confirms that the receiver has locked on to the correct frequency for that satellite. To find a C/A code with a high correlation with the signal, many C/A codes may be processed. Additionally, because the signal is transmitted and received as a continuous stream of data with no beginning or end (other than periodic C/A code inversions), the GPS receiver may not be able to immediately align the received signal with a C/A code. The starting position of the C/A code is thus repeatedly rotated by one chip position and the resulting order of code components is compared with the received signal in search of a correlation, until all possible alignments have been tested or until a match is detected. Alternatively, after the received signal is broken down into epochs of signal components, the assumed starting position of an epoch of signal components may be rotated and compared with a static order of C/A code components in search of a correlation. An epoch of signal components or code components with a particular assumed starting position is referred to herein as a "rotation" of the received signal or C/A code, respectively. The process for correlating the signal with the C/A code, as described below, may be repeated for each C/A code possibility evaluated. Therefore, multiple correlations may be calculated for each C/A code and multiple C/A codes may be tested, and these computations may be repeated for each frequency bin.

According to one approach, the invention provides a GPS receiver that employs two data buffers: a first buffer for storing data as it is received from a GPS satellite, and a second buffer for processing previously received data. However, the GPS receiver may have only one data buffer, or it may have any number of data buffers. An integer number of epochs of data are collected in the first buffer while data in the second buffer is processed. The data processing involves several steps.

As mentioned above, the stored data is searched using a number of frequency bins. For a particular frequency bin, the stored data is frequency shifted such that its frequency aligns with the particular frequency bin. To do so, each sample in the stored data is multiplied by a frequency shift factor, $e^{-2\pi j \omega n}$, where $\omega$ corresponds to the magnitude of the frequency shift, and n corresponds to the position of the sample. The frequency shifted sample can be represented as having an in-phase component I (a real number component) and a quadrature phase component Q (an imaginary number component). According to Euler's formula ($e^{ix}$=cos x+i sin x), the I component=sample×cos($-2\pi \omega n$), and the Q component=sample×j sin($-2\pi \omega n$). Each sample of the data may be processed using the equation above. The complex notation maintains the phase information of the signal, thereby allowing the samples to be coherently combined.

According to one embodiment, the invention combines the coherent data together and then correlates the combined data with stored C/A codes in search of a high correlation value. The result of the coherent combination of a number of signal components in a particular epoch position from multiple epochs of data is referred to herein as a "super-sample." In one implementation, ten epochs of data are combined to form a super-sample. However, according to other implementations, any number of epochs may be so combined. According to one feature, to coherently combine the samples, after the device frequency shifts the first sample of each stored epoch, the device adds the first frequency shifted samples together, to form one combined coherent super-sample.

In one embodiment, to search for a correlation, the device calculates correlation scores using standard correlation calculation techniques known in the art, substituting the super-samples for the samples traditionally used to calculate such correlations. In another embodiment, the device calculates correlation scores based on a series of accumulations of a set of super-samples, including one super-sample for each position in an epoch, and the possible C/A codes. If there are more super-samples than chips in the C/A code, the C/A code is sampled to provide a number of code components equal to the number of super-samples.

As the timing offset between the device and each satellite is unknown, the device calculates a number of correlation scores for each C/A code equal to the number of super-samples. For each correlation score, the device assumes a different starting code position for the C/A code, corresponding to a different possible timing offset.

To calculate the correlation score between the set of super-samples and a C/A code assuming a particular initial code component, the device combines each super-sample in the epoch of super-samples, by either adding or subtracting the super-sample to the correlation score, based on the value of a corresponding C/A code component. For example, in one implementation, each code component of the C/A code serves as a control bit for an accumulator. If the C/A code component in a given position equals 1, then the device adds the value of the super-sample in that position of the epoch of super-samples to the value stored in the accumulator. If the C/A code component in a given position equals 0, then the device subtracts the value of the super-sample in the corresponding position of the epoch of super-samples from the value stored in the accumulator. After the value of a super-sample has been added or subtracted to the value stored in the accumulator, the device shifts the C/A code by one code position and retrieves a new super-sample. That is, the device processes the next super-sample in the epoch of super-samples based on the value of the next code component in the C/A code. The process may continue until the device processes the entire epoch of super-samples. Alternatively, the device may cease processing after processing a predetermined portion of the epoch of super-samples. Upon completion, a high correlation score in an accumulator corresponds to a match, and a low correlation score corresponds to no match.

In one implementation, the device includes one accumulator corresponding to each possible initial starting code position of the C/A code, and the values in the accumulators are set to zero before correlation for the C/A code begins. In this implementation, the first accumulator accumulates a correlation score corresponding to a first C/A code starting position, while a second accumulator accumulates a correlation score corresponding to a second C/A code starting position (i.e., it begins with the second chip of the C/A code), and so forth. Thus, the device can process all possible timing offsets in a near-simultaneous manner.

The device can repeat the correlation process for the C/A codes of all, or a subset of all, possible satellite C/A codes. Additionally, the data in the data buffer may be reprocessed using a different frequency shift to represent data in a different frequency bin.

According to one embodiment, the data in the accumulators is transferred to a non-coherent accumulator. The non-coherent accumulator performs magnitude integration on the results of the correlation score calculations. For example, for a given frequency shift, C/A code, and C/A code starting position, over a one second period, the device will calculate 100 coherent correlation scores. The non-coherent accumulator accumulates the magnitudes of each of these 100 coherent correlation scores, increasing the sensitivity of the device, and thus its performance in low SNR environments.

In another embodiment of the invention, several steps in the method for real-time data processing of GPS signals are altered. The signal components of one data epoch are each frequency shifted as described above, and stored in a sample accumulator. The sample accumulator includes a memory location for each signal component in the data epoch. As the signal components of the next data epoch are frequency shifted, they are added to the corresponding signal components already stored in the sample accumulator. This is repeated for all the epochs of data in the buffer, resulting in one epoch of combined coherent super-samples. The device then calculates correlation scores for the epoch of combined coherent super-samples and the possible C/A codes in search of a high correlation value.

In one implementation, the device includes only one correlation score accumulator, and the value in the correlation score accumulator is set to zero before correlation score calculation for a particular C/A code begins. In this implementation, only one C/A code rotation, corresponding to one C/A code starting position, is analyzed at a time. After the correlation score for the first rotation of the C/A code has been calculated, it is moved to the non-coherent accumulator, and the correlation score for the second rotation of the C/A code, corresponding to the second C/A code starting position (i.e., the correlation score assuming the C/A code begins at the second code position), is calculated. Thus, in this implementation, the device processes the rotations of the C/A code serially.

The device repeats the correlation process for additional C/A codes (for different satellites). This process may be repeated to cover all, or a subset of all, possible satellite C/A codes. Additionally, the data in the data buffer may be reprocessed using a different frequency shift to represent data in a different frequency bin. According to one embodiment, the data in the accumulators is transferred to a non-coherent accumulator. The non-coherent accumulator performs magnitude integration on the results, increasing the sensitivity of the device, and thus its performance in low SNR environments.

BRIEF DESCRIPTION OF THE DRAWINGS

The foregoing and other objects and advantages of the invention will be appreciated more fully from the following further description thereof, with reference to the accompanying drawings wherein.

DESCRIPTION OF THE ILLUSTRATED EMBODIMENTS

To provide an overall understanding of the invention, certain illustrative embodiments will now be described, including systems, methods and devices for providing improved acquisition and processing of positioning signals from satellites in low signal to noise ratio (SNR) environments. However, it will be understood by one of ordinary skill in the art that the systems and methods described herein can be adapted and modified for other suitable applications and that such other additions and modifications will not depart from the scope hereof.

Figure 1:
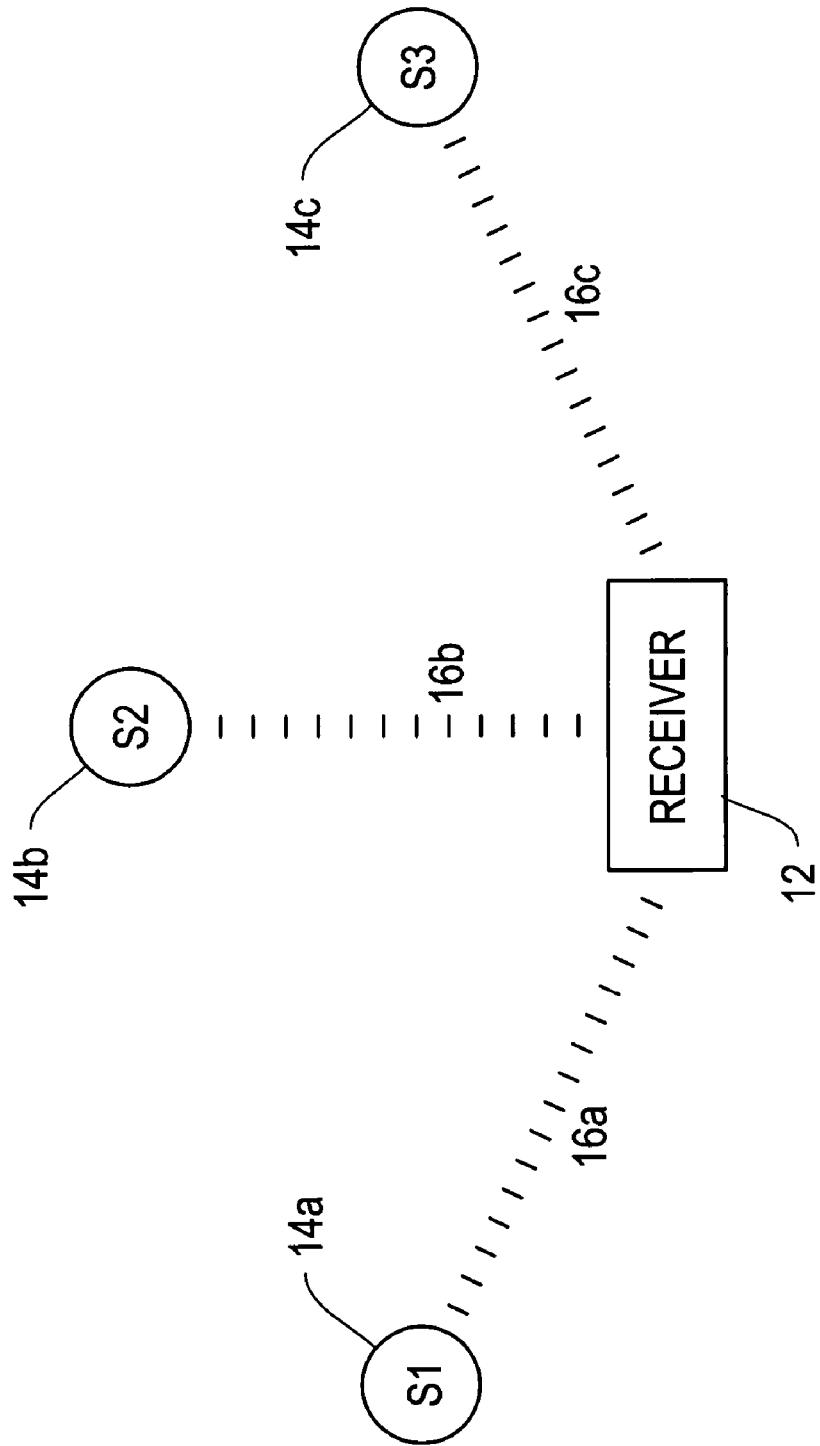
FIG. 1 is a conceptual diagram of the GPS operating environment.

FIG. 1 shows a high level schematic of a system 10 for receiving satellite signals. FIG. 1 shows a receiver 12 and three satellites 14a-14c. Each satellite 14a-14c transmits a spread spectrum L1 signal 16a-16c. The receiver 12 receives the satellite signals 16a-16c via an RF front end, and then digitally processes the data to identify the satellites 14a-14c and thereby determines its location.

According to one embodiment, an epoch of data of a received satellite signal 16a, 16b, or 16c is a sequence of digitized signal data of a given length that represents the identification code for a particular satellite. For example, in GPS satellite L1 signals, an epoch of data includes one-millisecond of data, i.e., the length of time a GPS satellite takes to transmit one period of its C/A code. One epoch therefore includes the 1023-chip sequence of the satellite's C/A code, which is the identification code, for that particular satellite. A GPS satellite typically transmits its C/A code continuously, from time to time (for example, every 20 milliseconds) switching between the C/A code and the inverse of the C/A code.

Depending on a receiver's digital sampling rate for a received L1 signal, the epoch of digitized signal data will include a number of data signal samples, or signal components, each of which might be considered to occupy one position in the epoch. For example, the receiver may sample the signal such that for each millisecond epoch, the receiver takes 1023 samples, resulting in 1023 signal components. Alternatively, the 1023-chip epoch of the L1 signal might be sampled at twice that rate, resulting in 2046 signal components. Each signal component is assigned an epoch position based on the order it is received. For example, the first signal component, corresponding to the first sample in a given millisecond signal epoch is assigned the first epoch position. The $100^{th}$ signal component is assigned the $100^{th}$ epoch position.

Figure 2:
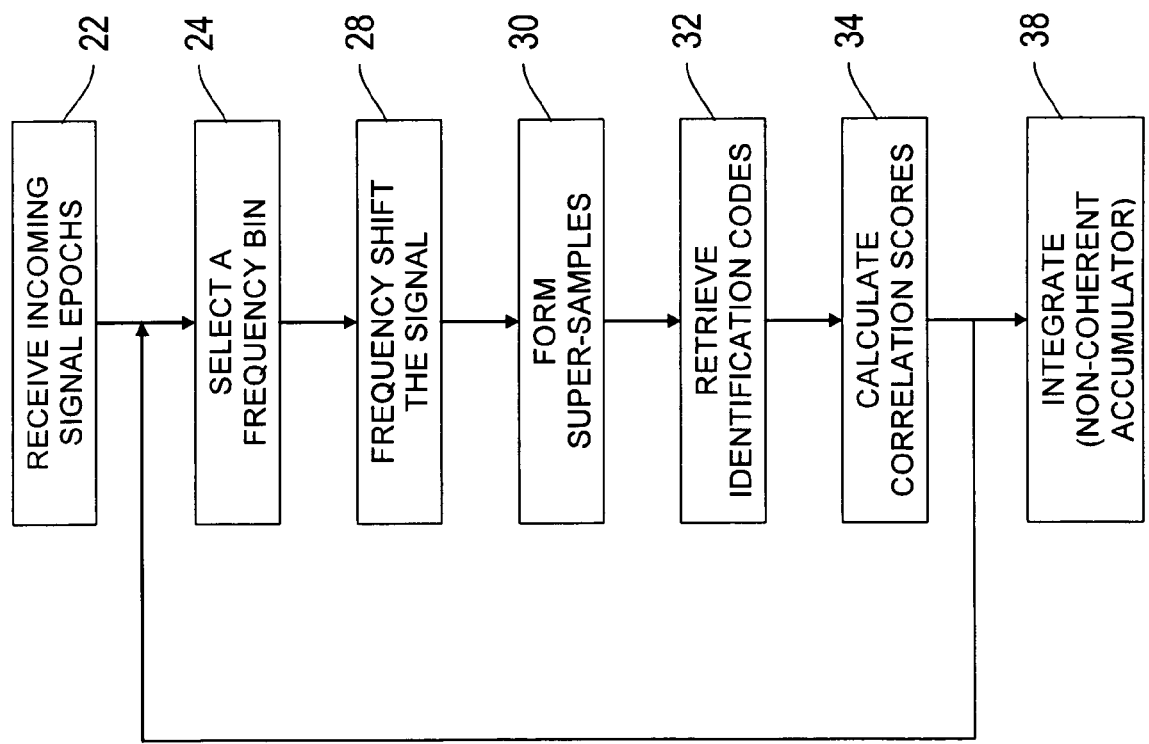
FIG. 2 is a block diagram of a method by which a receiver detects satellite signals, according to an illustrative embodiment of the invention.

FIG. 2 depicts a functional block diagram of method 20 for receiving satellite signals and identifying satellites from which the signal was sent. The method 20 may be employed by a receiver, such as the receiver 12 of FIG. 1. The method 20 begins with the receiver 12 receiving a signal (step 22) through an RF front end. The received signal includes a plurality of epochs or periods of the signals transmitted from various satellites. In alternative implementations, the signal may be received from other transmission sources, such as cell towers or other transmitters. The receiver 12 then digitizes the received signal. The receiver then samples the digitized signal at its transmission frequency or an integer multiple thereof, resulting in a plurality of signal samples also referred to as signal components. Each signal component may have both a magnitude and a phase, or it may be stored as having in-phase (I) and quadrature (Q) components. According to Euler's formula ($e^{ix} = \cos x + i \sin x$), the I component=sample×cos(−2πωn), and the Q component=sample×j sin(−2πωn).

The exact frequency of the incoming signal is unknown due to frequency changes caused by, for example, the Doppler shift and local oscillator uncertainties. In the case in which the received signal is an L1 signal, as described above, the signal was transmitted by the satellites at a frequency of 1575.42 MHz. In transition, the frequency of the L1 signal may have changed by 4-5 kHz. Thus, to identify a signal, a device searches over a frequency range of 1575.415 kHz to 1574.425 kHz. The frequency range may be subdivided into a plurality of frequency bins. The receiver iteratively analyzes the received signal based on each frequency bin (steps 24 to 34) to identify the source of the received signal.

The iterative analysis begins with the receiver 12 selecting one of the frequency bins to search for the transmitted signal (step 24). The samples of the signal are frequency shifted to the selected frequency bin (step 28) by multiplying each sample in the received signal by a frequency shift factor, $e^{-2\pi j \omega n}$, where ω corresponds to the magnitude of the frequency shift, and n corresponds to the position of the sample across all epochs used in forming the super sample. For example, to analyze a received L1 signal at 1575.415 kHz, the first sample of a first epoch of the signal is multiplied by $e^{-2\pi j \times (-5\ kHz) \times 1}$, and the second sample is multiplied by $e^{-2\pi j \times (-5\ kHz) \times 2}$. Similarly, if the signal is sampled at twice the data rate of the C/A code (2046 Hz), the first sample of the second epoch of the signal is multiplied by $e^{-2\pi j \times (-5\ kHz) \times 2047}$. The device stores both the I and Q components of the frequency shifted sample. The complex notation maintains the phase information of the signal, resulting in signal data which can be coherently combined.

After the signal components have been frequency shifted (step 28), the receiver 12 coherently combines the frequency shifted signal components of a plurality of epochs of the received signal set to form a set of "super-samples" (step 30). A super-sample is formed when two or more frequency shifted signal components from the same position of a plurality of epochs of a received signal are added together, emphasizing the intended value of the signal component and reducing the impact of noise on any of the individual signal components. That is, super-samples have an increased signal-to-noise ratio. Two illustrative methods and corresponding implementations for forming super-samples are shown in FIGS. 3A-3B and FIGS. 4A-4B.

After forming the super-samples (step 30), the receiver 12 retrieves satellite identification codes (step 32), such as the C/A codes associated with GPS satellites. The receiver 12 may have one or more of the identification codes associated with each satellite stored in memory. The receiver uses the set of super-samples and the retrieved identification codes to calculate correlation scores for each satellite. Three illustrative methods and corresponding implementations for calculating correlation scores are shown in FIGS. 5A-5B, FIGS. 6A-6B, and FIGS. 7A-7B.

The calculated correlation scores are sent to a non-coherent accumulator in step 38, which performs magnitude integration on the results. The non-coherent accumulator includes a memory location for each possible C/A code, C/A code starting position, and frequency shift combination. Over a one second period, for each frequency shift, C/A code, and C/A code starting position combination, the receiver 12 calculates 100 coherent correlation scores. The non-coherent accumulator separately accumulates (or integrates) the magnitudes of each of these 100 coherent correlation scores. As a result of the integration, true correlations in the individual correlation scores are emphasized, and while the noise does not. The integration process thus increases the sensitivity of the receiver 12, and thus its performance in low SNR environments. After step 34 has been completed, the receiver 12 begins another iteration of method 20 by selecting another frequency bin (step 24).

In alternative implementations, in step 34 the device may utilize standard Fast Fourier Transform correlation techniques known in the art, using the generated super-samples as input data.

Figure 3A:
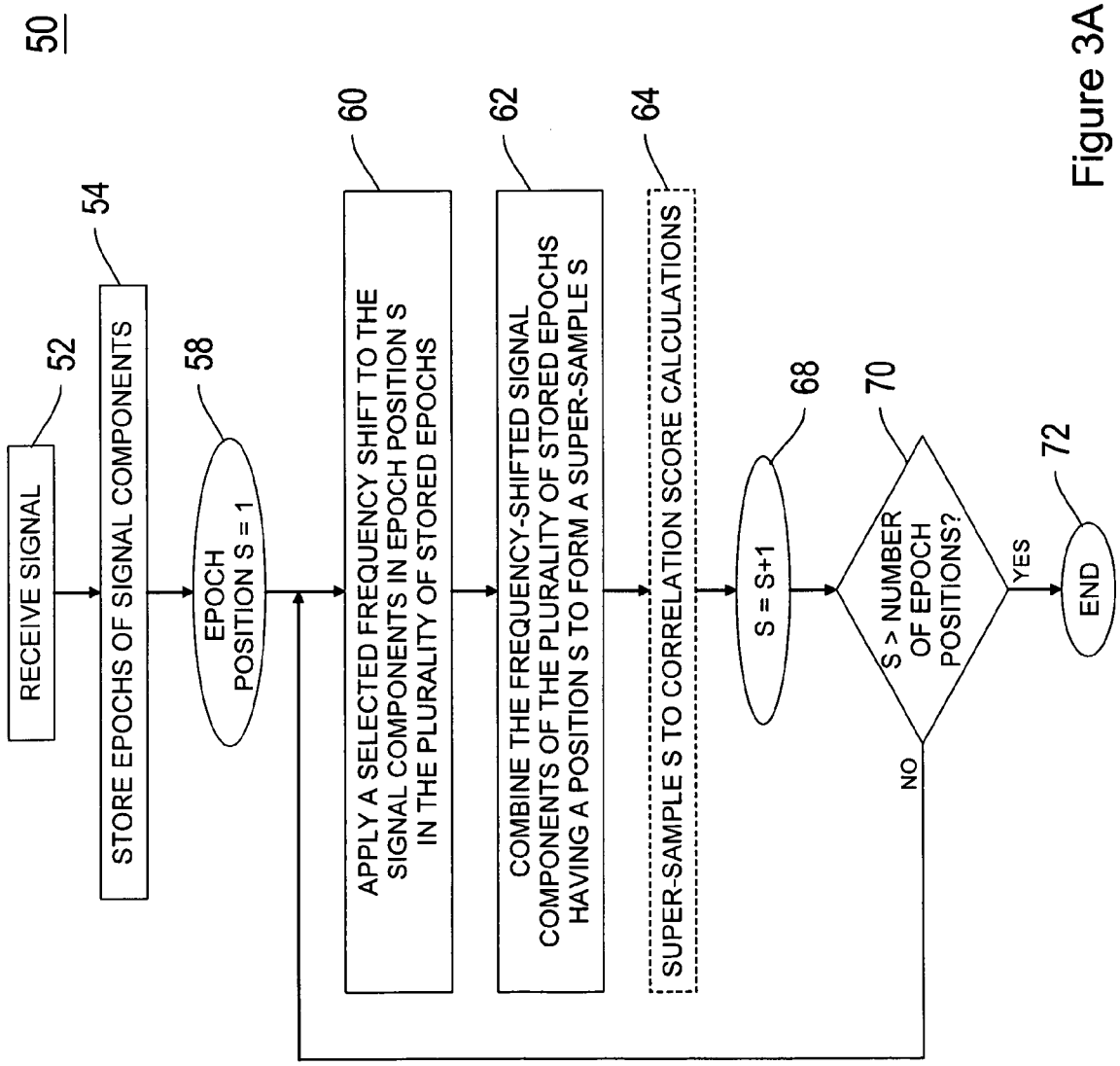
FIG. 3A is a block diagram of a first method for creating super-samples for use in the method of FIG. 2, according to an illustrative embodiment of the invention.

FIG. 3A is a block diagram of one method 50 of creating super-samples, according to an illustrative embodiment of the invention. The super-sample creation method 50 creates one super-sample at a time by combining the signal components at a selected position in each of the epochs of the received signal. The super-sample creation method 50 begins with a receiver, such as receiver 12 of FIG. 1, receiving a signal (step 22 of FIG. 2). The receiver 12 stores the received signal as epochs of signal components (step 54), with each epoch stored separately in at least one buffer. Once the buffer holds the signal component in the first position of each epoch to be analyzed, a frequency shifter frequency shifts the signal components (step 60) in the first position in each of the plurality of stored epochs according to a selected frequency bin, as described above in step 28 of FIG. 2. Once the signal components in the first epoch positions of each stored epoch are frequency shifted, an adder adds the first frequency shifted samples together, resulting in one combined coherent "super-sample." (step 62). The first super-sample may then be used to begin calculating correlation scores (step 64) as described in FIGS. 6A-6B and FIGS. 7A-7B. The receiver 12 then iteratively repeats the super-sample creation method 50 for each epoch position in the epoch of signal components.

Figure 3B:
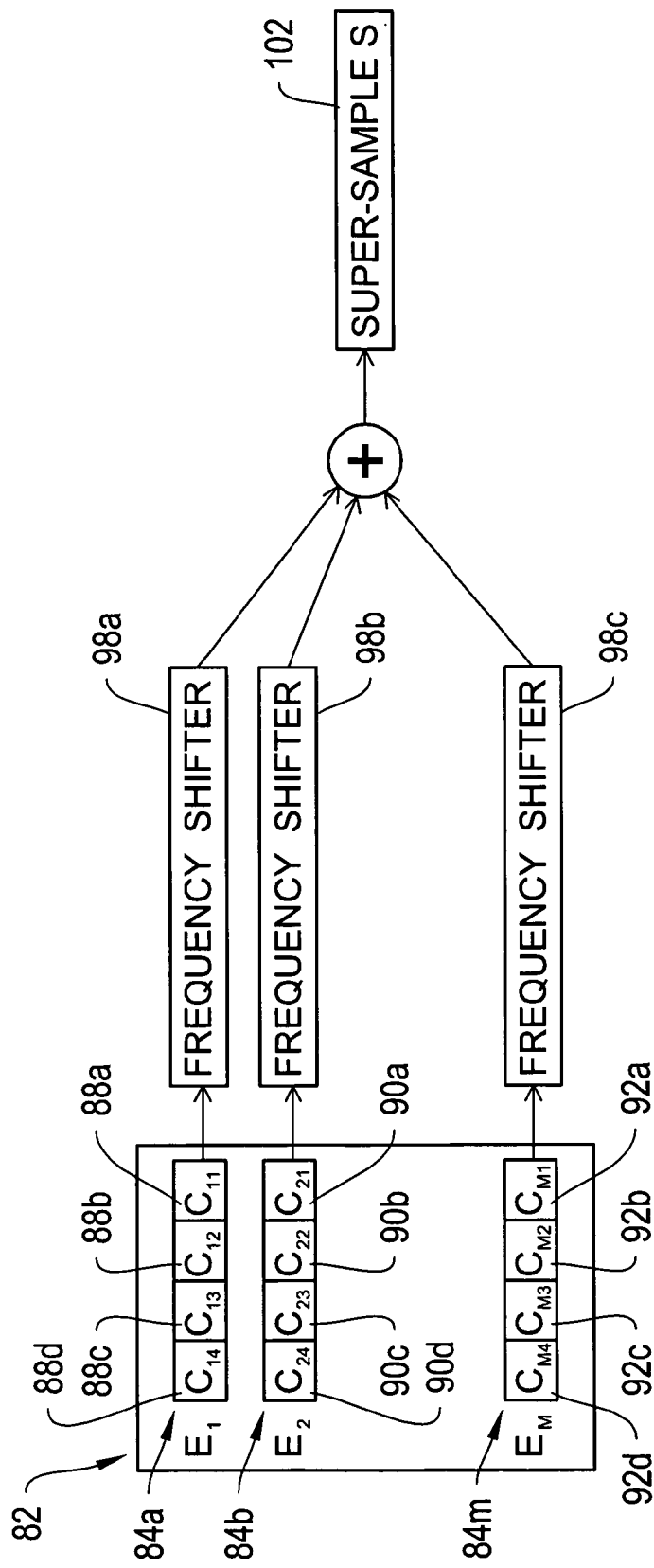
FIG. 3B is a conceptual diagram of super-sample generator implementing the method of FIG. 3A, according to an illustrative embodiment of the invention.

FIG. 3B illustrates a conceptual diagram 80 of a super-sample generator, which implements the method 50 described in FIG. 3A. The super-sample generator 80 includes a memory 82, which stores epochs of signal components of the received signal. The memory can be a buffer, a register, a shift register, a cache, RAM, or any other readable and writeable form of electromagnetic or optical memory. The memory 82 contains m (where m is an integer) epoch-long memory buffers 84a-84m, each storing one epoch of signal components 88a-88d, 90a-90d, and 92a-92d (for illustrative purposes, only 4 of the signal components of the epoch are shown). The buffers are filled sequentially, with the first epoch of the received signal filling the first buffer 84a, the second epoch filling the second buffer 84b, and so forth. After the buffers 84a-84m have received the signal components 88a, 90a, and 92a in the first position of each epoch, the signal components 88a, 90a, and 92a in the plurality of stored epochs in the buffers 84a-84m are frequency shifted by frequency shifters 98a-98c according to a selected frequency bin (see step 24 of FIG. 2). Next, the frequency-shifted signal components from the first epoch position of each stored epoch are added together by an adder 100, resulting in one combined coherent super-sample 102 having an I and a Q component.

As mentioned above, GPS satellites, from time to time, transmit L1 signals which include inverted epochs of the C/A code. The receiver 12, in some circumstances, can predict these inversions and take them into account in forming super-samples. The prediction can be based on, for example, general knowledge of the location of the receiver 12, knowledge of data being modulated into C/A code by the satellite, or information provided by other signal transmitters, such as cell towers. If the receiver 12 has sufficient information to determine that a satellite is due to invert its C/A code, the receiver 12 can selectively subtract a signal component from a super-sample accumulation, instead of adding it.

The first super-sample 102 may be sent to a correlation score calculator, which begins calculating correlation scores, and as shown in FIGS. 6A-6B and FIGS. 7A-7B. After the super-sample 102 has been created, the super-sample generator 80 begins generating a next super-sample, for example by using the signal components 88b, 90b, and 92b in the second position of each epoch of stored data. Note that one super-sample for each epoch position may be computed for each frequency bin, and thus the method 50 of FIG. 3A, as performed by the super-sample generator 80, may be repeated for a plurality of frequency shifts.

Figure 4A:
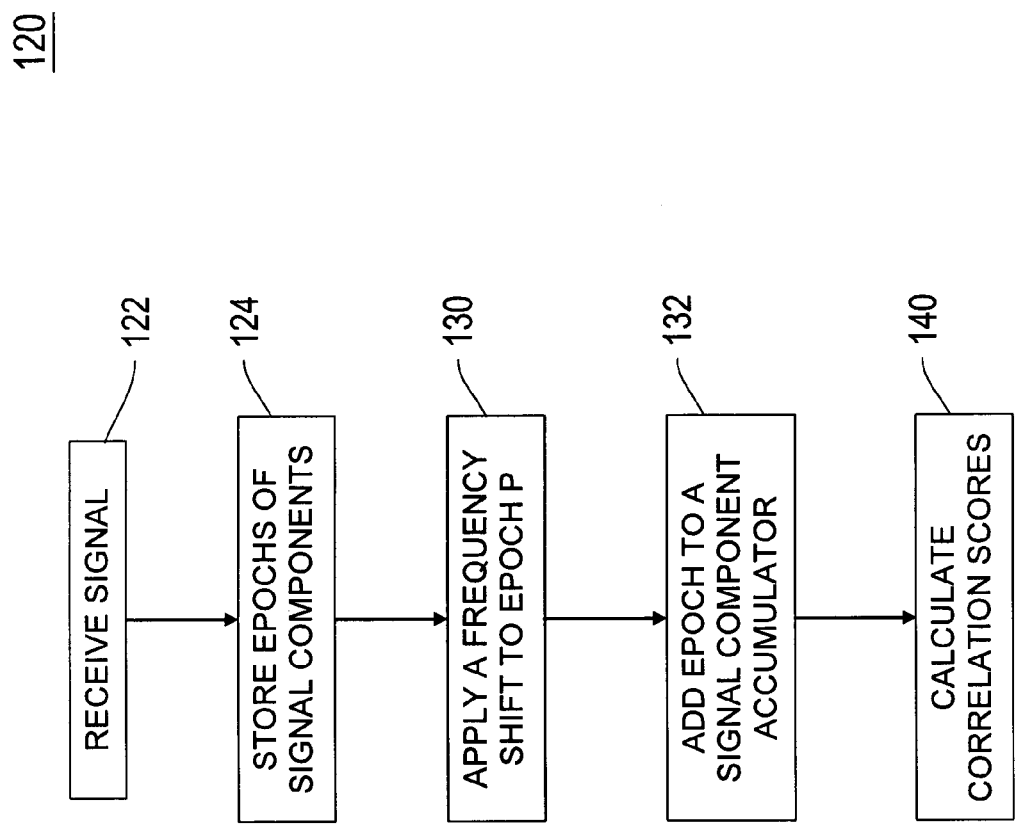
FIG. 4A is a block diagram of a second method for creating super-samples for use in the method of FIG. 2, according to an illustrative embodiment of the invention.

FIG. 4A is a block diagram of a second method 120 of creating super-samples, according to an illustrative embodiment of the invention. The super-sample creation method 120 creates one epoch of super-samples substantially concurrently by combining the epochs of signal components of the received signal. The super-sample creation method 120 begins with a receiver, such as the receiver 12 of FIG. 1, receiving a signal (step 22 of FIG. 2). The receiver 12 stores the received signal as epochs of signal components, with the epochs stored together in a buffer. Once the buffer holds the first epoch of signal components, a frequency shifter frequency shifts the signal components in each position (step 130) of the first epoch, as described above in step 28 of FIG. 2. Once the signal components in the first epoch are frequency shifted, an adder adds the frequency shifted samples to an accumulator (step 132), maintaining separate accumulators for each position in the epoch. If there is more than one epoch of stored signal components, steps 130 and 132 are repeated, frequency shifting the signal components of the other epochs of signal components (step 130), and adding the frequency shifted signal components to the values stored in the accumulator (step 132). After the signal components of each epoch have been frequency shifted and added to the accumulator, the values stored in each position of the accumulator serve as a set of super-samples for calculating correlation scores. The method 120 can be repeated to calculate epochs of super-samples for each frequency bin.

Figure 4B:
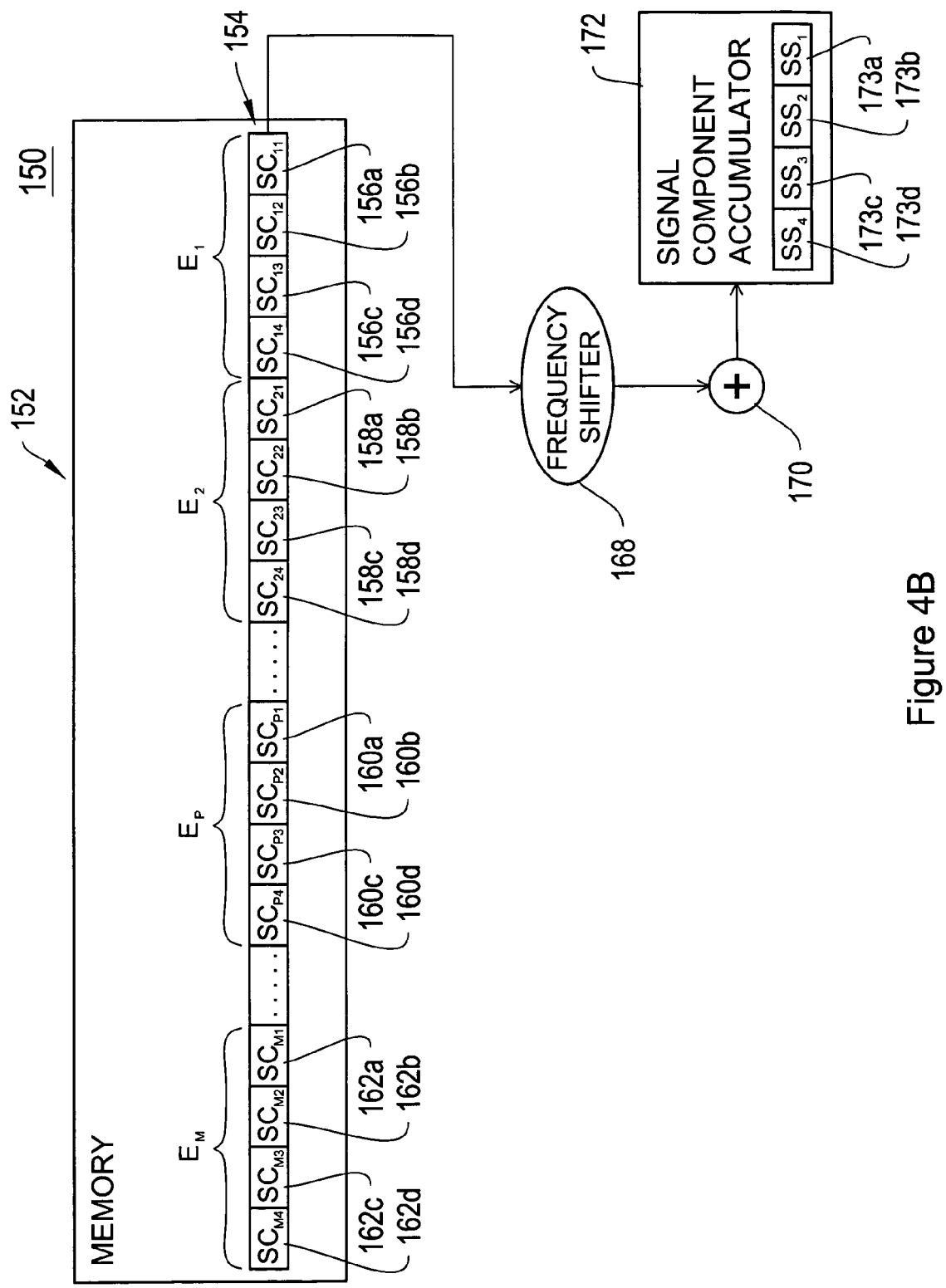
FIG. 4B is a conceptual diagram of super-sample generator implementing the method of FIG. 4A, according to an illustrative embodiment of the invention.

FIG. 4B illustrates a conceptual diagram 150 of a second super-sample generator, which implements the method 120 described in FIG. 4A. The super-sample generator 150 includes a memory 152, which stores epochs of signal components of the received signal. The memory can be a buffer, a register, a shift register, a cache, RAM, or any other readable and writeable form of electromagnetic or optical memory. The memory 152 contains a single memory buffer 154, which stores m (where m is an integer) epochs of signal components 156a-156d, 158a-158d, 160a-160d, 162a-162d (for illustrative purposes only, only 4 of the signal components of each epoch are shown). The buffer 154 is filled sequentially with the signal components 156a-3 of the signal as they are received. After the buffer 154 has received the signal components 156a-156d of the first epoch, the signal components 156a-156d are frequency shifted by a frequency shifter 168 according to the selected frequency bin as described in step 130 of FIG. 4A (see also step 24 of FIG. 2). Next, the frequency shifted signal components 156a-156d are sent to an adder 170 and added to the values in a signal component accumulator 172 (see step 132 of FIG. 4A), the values of which were initially set to zero. Next, a second epoch of signal components 158a-158d are frequency shifted by the frequency shifter 168, and added to the values in the signal component accumulator 172. The super-sample generator iterates this process, as described in steps 130 and 132 of FIG. 4A, until a selected number of epochs of signal components have been frequency shifted and added to the signal component accumulator 172, resulting in one epoch of combined coherent super-samples 173a-173d having I and Q components, stored in the signal component accumulator 172.

Figure 5A:
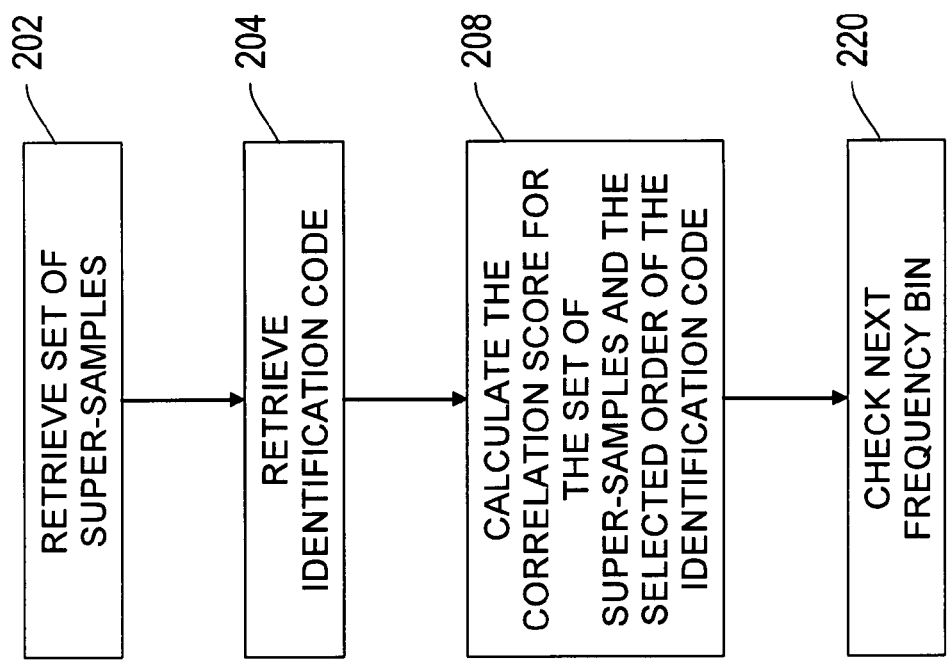
FIG. 5A is a block diagram of a method for calculating correlation scores for use in the method of FIG. 2, according to an illustrative embodiment of the invention.

FIG. 5A is a block diagram of a method 200 for calculating correlation scores, according to an illustrative embodiment of the invention. This method may be used, for example, in step 34 of FIG. 2. Using the method 200, a receiver, such as receiver 12 of FIG. 1, calculates correlation scores based on super-samples derived from the received signal data and stored satellite identification codes, in search of a high correlation score which would identify the satellite transmitting a received signal and the satellite's corresponding time and frequency offset with respect to the receiver. The correlation score calculation method begins with a receiver 12 retrieving an epoch of super-samples from a super-sample generator, such as the super-sample generator 80 of FIG. 3B or the super-sample generator 150 of FIG. 4B (step 202). The receiver 12 also retrieves a satellite identification code from memory in step 204 (see step 34 of FIG. 2). For the receiver 12 to detect a correlation between a received signal and a C/A code, the set of super-samples generated from the received signal must be temporally aligned with the code components of the C/A code. That is, the first super-sample in the set of super-samples needs to be aligned with first code component of the C/A code. Thus, the receiver iteratively calculates multiple correlation scores for a given set of super-samples and a given C/A code (step 208) while rotating the C/A code one position in each iteration. For example, for a C/A code of 1011, the receiver iteratively calculates four correlation scores for a single set of super-samples. In the first iteration, the receiver uses a C/A code of 1011. In subsequent iterations, the receiver uses C/A codes of 0111, 1110, and 1101. Alternatively, the C/A code can remain constant and the receiver can rotate the set of super-samples one position for each iteration.

Figure 5B:
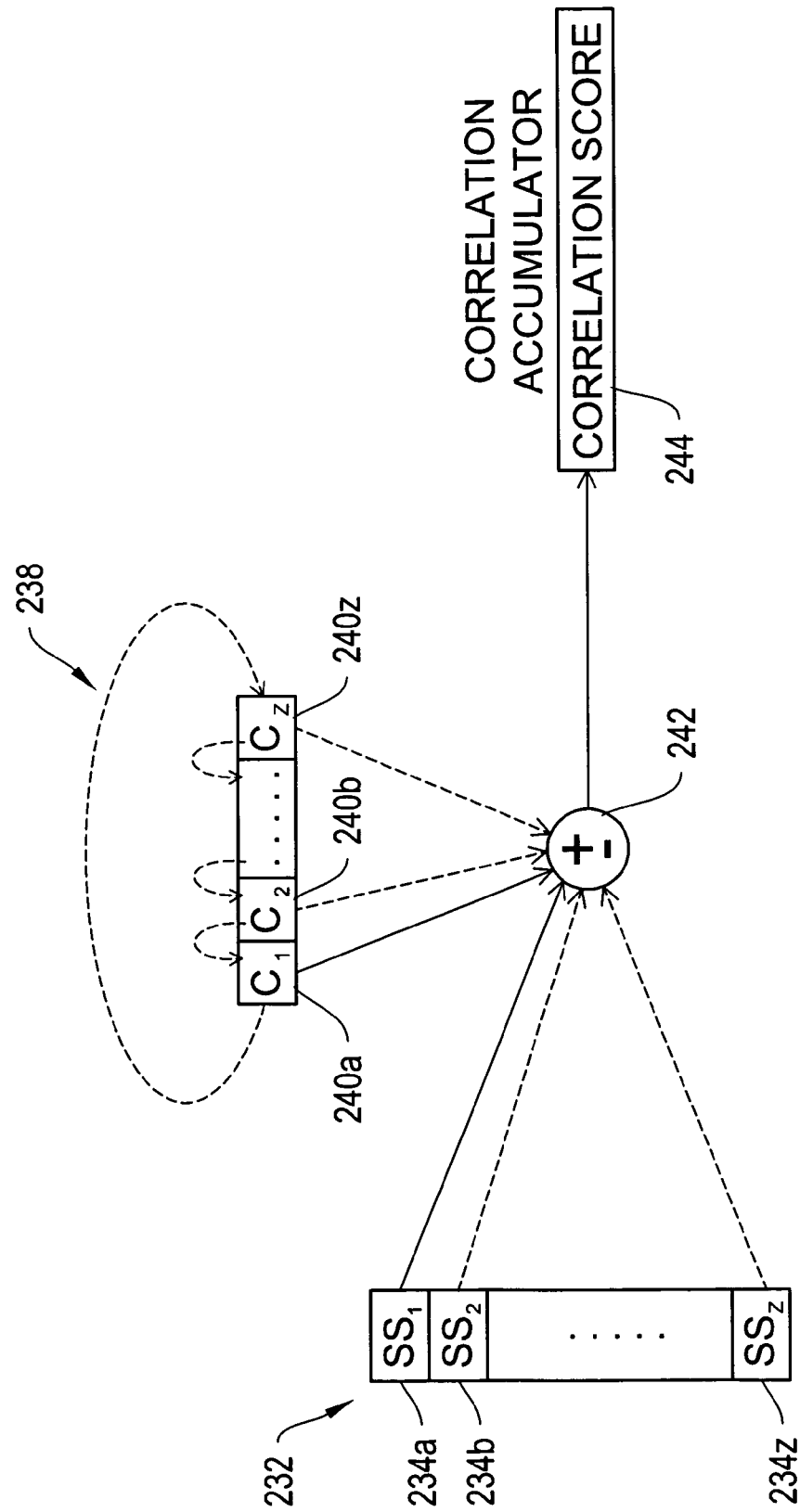
FIG. 5B is a conceptual diagram of a correlation score calculator implementing the method of FIG. 5A, according to an illustrative embodiment of the invention.

FIG. 5B is a conceptual diagram of a correlation score calculator 230, which implements the method 200 described in FIG. 5A, according to an illustrative embodiment of the invention. The correlation score calculator 230 includes a memory containing one buffer 232 for storing a set of super-samples, a second buffer 238 for storing an identification code, and a third buffer 244 for accumulating the correlation score as it is calculated. In an alternative implementation the identification code and/or the set of super-samples are stored in a circular buffer or a circular shift register. The buffer 244 for accumulating the correlation score is initially set to zero. To calculate the correlation score for the set of super-samples and a first rotation of the identification code (i.e., the sequence of code components of the identification code with a first assumed starting position), the correlation score calculator begins by comparing a first super-sample 234*a* to a first code component 240*a* at an adder/subtracter 242. Based on the value of the code component 240*a*, the correlation score calculator either adds the super-sample 234*a* to or subtracts the super-sample 234*a* from the value in the correlation accumulator 244. The correlation score calculator similarly adds the super-samples 234*b*-234*z* to or subtracts the super-samples 234*b*-234*z* from the value in the correlation accumulator 244, based on the value of the corresponding code components 240*a*-240*z*. The value stored in the correlation accumulator 244 after the last code component 234*c* has been added to/subtracted from the value stored in the correlation accumulator 244, serves as the correlation score. The correlation score calculator 230 may then calculate a next correlation score using the set of super-samples 232 and a second rotation of the identification code 238.

Figure 6A:
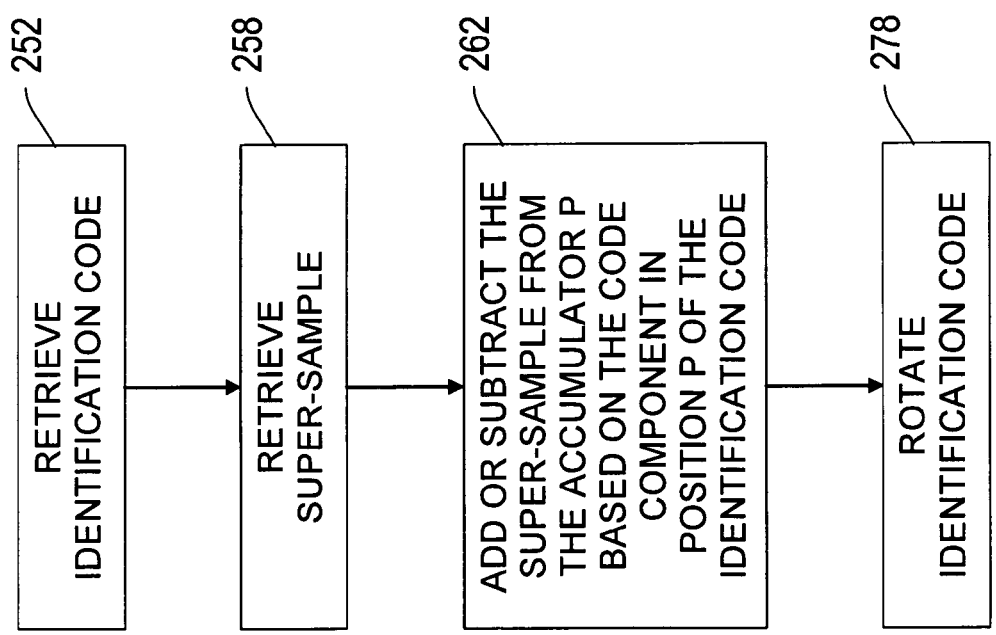
FIG. 6A is a block diagram of a second method for calculating correlation scores for use in the method of FIG. 2, according to an illustrative embodiment of the invention.
Figure 6B:
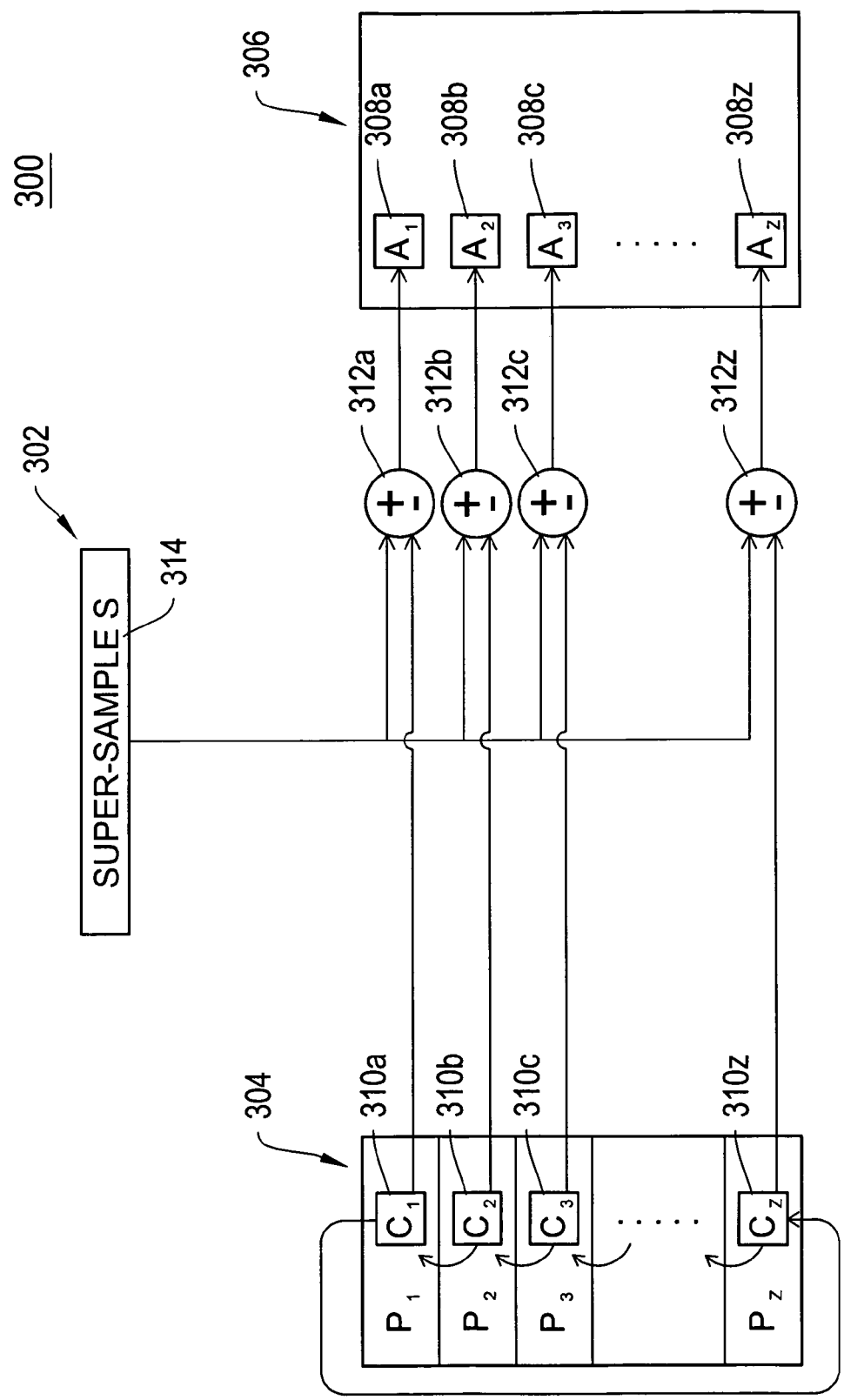
FIG. 6B is a conceptual diagram of correlation score calculator implementing the method of FIG. 6A, according to an illustrative embodiment of the invention.

FIG. 6A is a block diagram of a second method 250 for calculating correlation scores according to an illustrative embodiment of the invention. FIG. 6B is an illustrative conceptual block diagram of a correlation score calculator 300 implementing the second correlation score calculation method 250. In comparison to the correlation score calculation method 200 of FIG. 5A, the correlation score calculation method 250 and the correlation score calculator 300 calculate correlation scores for a set of super-samples for each possible rotation or alignment of a C/A code at the same time, as opposed to one rotation or alignment at a time.

Referring specifically to FIGS. 6A and 6B, the correlation score calculation method 250 begins with a correlation score calculator 300 retrieving a satellite C/A code and storing the C/A code in a code shift register 304 (step 252). The code shift register 304 stores each code component 310*a*-310*z* of the C/A code in a different register location. The correlation score calculator 300 also retrieves a super-sample 314 and stores the super-sample 314 in a super-sample register 302 (step 258). The correlation score calculator 300 includes an adder/subtracter 312*a*-312*z* corresponding to each code shift register location (i.e. each code component), and a correlation accumulation register 308*a*-308*z* corresponding to each code shift register location (i.e. each code component). Initially, the correlation score accumulators are set to 0.

The correlation score calculator 300 selects the super-sample 314 and the code component 310*a* stored in the first location of the code shift register 304. Based on the value on the code component 310*a* in the first location of the code shift register, the correlation score calculator either adds the super-sample 314 to or subtracts the super-sample 314 from the corresponding correlation accumulation register 308*a* (step 262). If the selected code component equals 1, the selected super-sample is added to the correlation accumulation register 308*a*. If the code component equals 0, the selected super-sample is subtracted from the correlation accumulation register 308*a*. At the same time, the correlation score calculator 300 carries out the same process with the super-sample 314 and the code components 310*b*-310*z* in each other location of the code shift register 304, thereby adding or subtracting the super-sample 314 to or from the corresponding correlation accumulation register 308*b*-308*z* (step 262). The code components 310*a*-310*z* in the code shift register are then shifted by one register location (step 278), such that for example, the second code component 310*b* occupies the first shift register location. The correlation score calculator retrieves a next super-sample and the process repeats until the last super-sample in the set of super-samples is added to or subtracted from the correlation score accumulators 308*a*-308*z*. The resulting values in the correlation score accumulators 308*a*-308*z* serve as the correlation scores. If the received signal was transmitted by a satellite using the selected C/A code, one of the correlation score accumulators 308*a*-308*z* will hold a relatively large number. If the received signal was not transmitted by a satellite using the selected C/A code, all of the correlation score accumulators 308*a*-308*z* will hold relatively low values, for example, values of near zero.

In an alternative embodiment of the invention, the super-samples may be multiplied by 1 or −1 based on the value of a code component, and then added to the corresponding correlation accumulator.

Figure 7A:
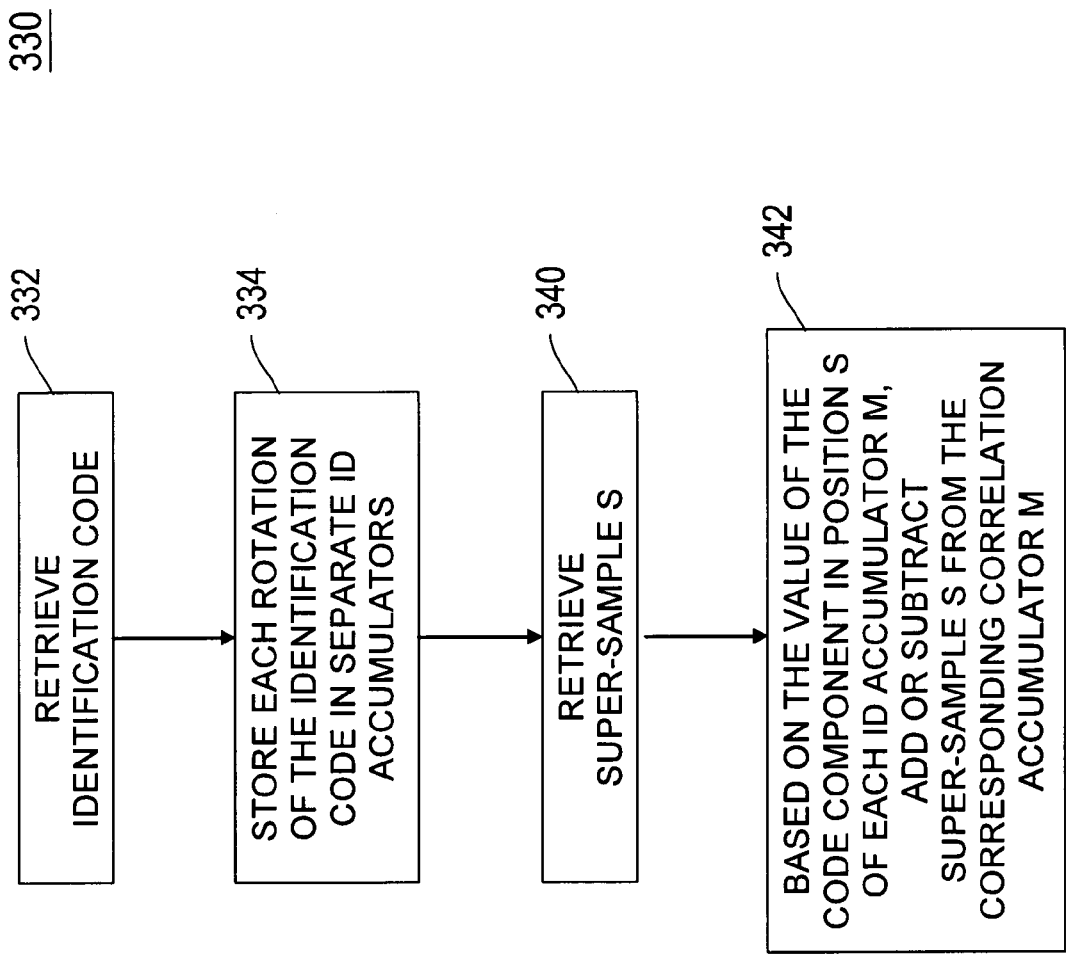
FIG. 7A is a block diagram of a third method for calculating correlation scores for use in the method of FIG. 2, according to an illustrative embodiment of the invention.
Figure 7B:
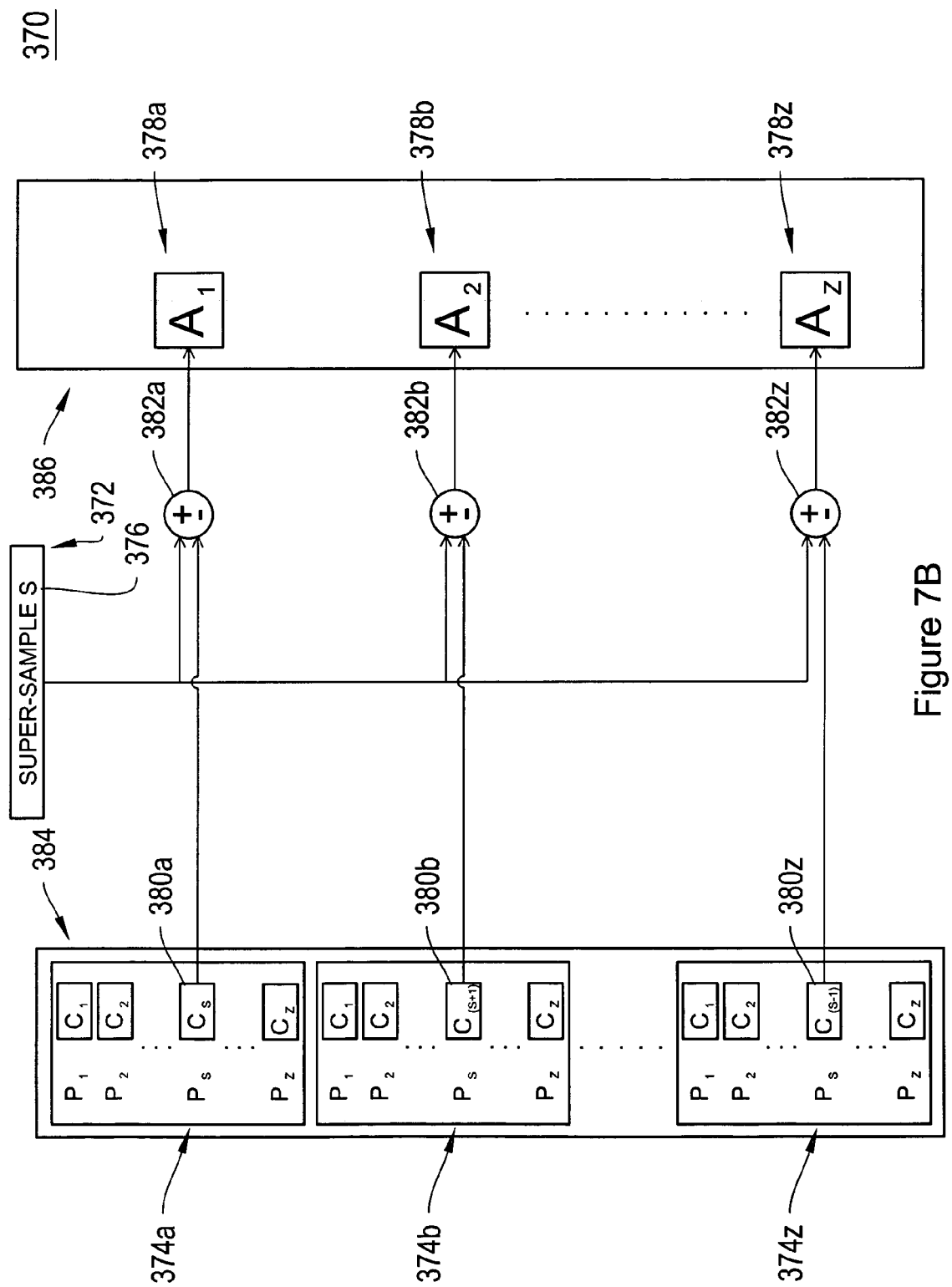
FIG. 7B is a conceptual diagram of correlation score calculator implementing the method of FIG. 7A, according to an illustrative embodiment of the invention.

FIG. 7A is a block diagram of a third method 330 for calculating correlation scores according to an illustrative embodiment of the invention. FIG. 7B is an illustrative conceptual block diagram of a correlation score calculator 370 implementing the correlation score calculation method 330. As in the correlation score calculation method 250 of FIG. 6A, the correlation score calculation method 330 and the correlation score calculator 370 calculate correlation scores for a set of super-samples and for each possible starting position of a C/A code at the same time, as opposed to serially. Referring specifically to FIGS. 7A and 7B, the correlation score calculation method 330 begins with a correlation score calculator 370 retrieving a satellite C/A code (step 332) and storing the C/A code in series of code shift registers 374*a*-374*z*. Each code shift register 374*a*-374*z* stores each code component of the C/A code in a different register location (step 334).

To analyze each possible starting position of the C/A concurrently, each code shift register 374*a*-374*z* stores the C/A code with a different starting position. For example, code shift register 374*a* stores the first code component of the C/A code in the first location of the code shift register 374a and the last code component in the last code shift register location. Code shift register 374b stores the second code component of the C/A code in the first location of the code shift register 374b and stores the first code component of the C/A code in the last code shift register location.

The correlation score calculator 370 retrieves a super-sample 376 and stores the super-sample 376 in a super-sample register 372 (step 340). The correlation score calculator 370 also includes an adder/subtracter 382a-382z corresponding to each code shift register 374a-374z (i.e. each C/A code rotation), and a correlation accumulation register 378a-378z corresponding to each code shift register 374a-374z (i.e. each C/A code rotation). Initially, the correlation score accumulators 374a-374z are set to 0.

The correlation score calculator 370 selects the first super-sample 376 and the first code component stored in each code shift register 374a-374z. Based on the value of the selected code components, the correlation score calculator 370 either adds the super-sample 376 to, or subtracts the super-sample 376, from the corresponding correlation accumulation registers 378a-378z (step 342). If the selected code component equals 1, the selected super-sample 376 is added to the corresponding correlation accumulation register. If the code component equals 0, the selected super-sample 376 is subtracted from the corresponding correlation accumulation register.

The correlation score calculator 370 then retrieves a next super-sample 376 and shifts code shift registers 374a-374z to select the next code component, respectively, from each code shift register 374a-374z. The process repeats until the last super-sample in the set of super-samples is added to or subtracted from the correlation score accumulators 378a-378z. The resulting values in the correlation score accumulators 378a-378z serve as the correlation scores. If the received signal was transmitted by a satellite using the selected C/A code, one of the correlation score accumulators 378a-378z would hold a relatively large number. If the received signal was not transmitted by a satellite using the selected C/A code, all of the correlation score accumulators 378a-378z will hold relatively small values.

In an alternative embodiment of the invention, the super-sample may be multiplied by 1 or −1 based on the value of a code component, and then added to the corresponding correlation accumulator.

In additional alternative implementations of the correlation score calculators 300 and 370, in which chip real estate is at a premium, the correlation score calculators 300 and 370 include a number of code shift registers equal to only a fraction of the number of code components in the C/A code. Or the shift code registers may contain fewer register locations than there are code components. In these implementations, the receivers 12 may calculate correlation scores based on only a fraction of an epoch and a corresponding fraction of the C/A code.

In still other embodiments, to reduce the amount of components used to calculate the correlation score, single addressable buffers are used in place of shift registers. In these embodiments, values stored in each position of the buffers can be concurrently routed to each adder. In calculating the correlation score, instead of shifting a shift register to alter the memory locations in which the signal or code components are stored, the receiver reroutes the data stored in each buffer location to a different adder.

As the super-sample generators 80 and 150 and the correlation score calculators 230, 300, and 370 can be implemented in clocked hardwired circuitry, such as an Application Specific Integrated Circuit, Field Programmable Gate Array, or other integrated circuit, the hardware can be optimized such that various steps in the methods of using the hardware may be executed concurrently to avoid wasted clock cycles. In other implementations, the super-sample generators 80 and 150 and/or the correlation score calculators 230, 300, and 370 may be implemented entirely, or in part, in software.

Those skilled in the art will know or be able to ascertain using no more than routine experimentation, many equivalents to the embodiments and practices described herein. For example, the methods and apparatus described herein can be used for acquiring CDMA encoded signals or other signals encoded with a predictable sequence of code components. Accordingly, it will be understood that the invention is not to be limited to the embodiments disclosed herein, but is to be understood from the following claims, which are to be interpreted as broadly as allowed under the law.

What is claimed is:

1. A method of signal processing comprising:
   receiving a signal including a plurality of epochs of signal components, the signal components in an epoch having corresponding epoch positions;
   calculating a plurality of super-samples to form a set of super-samples, wherein calculating a super-sample includes combining, from the plurality of epochs, signal components having an epoch position selected for the super-sample;
   providing an identification code including a plurality of code components, the code components having code positions in the identification code;
   calculating a first correlation score correlating the received signal to the identification code based on the set of super-samples and the identification code.

2. The method of claim 1, comprising applying a first frequency shift to the plurality of signal components of the received signal wherein the first correlation score is calculated based on the application of the first frequency shift.

3. The method of claim 2 comprising applying a second frequency shift to the plurality of signal components of the received signal wherein a second correlation score is calculated based on the application of the second frequency shift.

4. The method of claim 1, wherein the first correlation score is based on a first order of the code components in the identification code, and comprising calculating a second correlation score based on a different order of the code components.

5. The method of claim 1, comprising calculating a second correlation score based on a second identification code.

6. The method of claim 1, comprising storing the plurality of epochs of signal components separate from one another.

7. The method of claim 1, wherein forming one of the super-samples in the set of super-samples comprises:
   selecting an epoch position in the plurality of epochs; and
   combining the signal components in a plurality of the epochs corresponding to the selected epoch position.

8. The method of claim 1, comprising beginning a calculation of a correlation score for one super-sample in the set of super-samples, while forming another super-sample in the set of super-samples.

9. The method of claim 1, wherein forming the set of super-samples comprises, after receipt of an epoch of signal components, combining the signal components of the received epoch with the signal components of a previously received epoch, resulting in an epoch of combined signal components.

10. The method of claim 9, wherein forming the set of super-samples comprises, after receipt of an epoch of signal components, combining the signal components of the received epoch with the epoch of combined signal components of previously received epochs.

11. The method of claim 9, comprising forming an epoch of super-samples prior to calculating a correlation score.

12. The method of claim 1, comprising calculating the first correlation score by, for each super-sample in the set of super-samples, performing at least one of adding the super-sample to and subtracting the super-sample from, the correlation score.

13. The method of claim 12, comprising determining if the signal component is added to the correlation score based on the code component in the identification code in a position corresponding to the position of the super-sample in the epoch.

14. The method of claim 12, comprising determining if the signal component is subtracted from the correlation score based on the code component in the identification code in a position corresponding to the position of the super-sample in the epoch.

15. The method of claim 4, comprising calculating the first and second correlation scores substantially concurrently.

16. The method of claim 1, comprising altering a plurality of super-samples in the set of super-samples based on code components in the identification code having code positions corresponding to the positions of the altered super-samples.

17. The method of claim 16, wherein calculating the correlation score comprises adding the altered super-samples together.

18. A system for signal processing comprising:
 a receiver configured to receive a signal including a plurality of epochs of signal components, the signal components in an epoch having corresponding epoch positions;
 a processor configured to calculate a plurality of super-samples to form a set of super-samples, wherein calculating a super-sample includes combining, from the plurality of epochs, signal components having an epoch position selected for the super-sample;
 a memory configured to store an identification code including a plurality of code components, the code components having code positions in the identification code;
 a correlator configured to calculate a first correlation score correlating the received signal to the identification code based on the set of super-samples and the identification code.

19. The system of claim 18, comprising a frequency shifter for applying a frequency shift to the plurality of signal components of the received signal.

20. The system of claim 19, wherein:
 the frequency shifter applies a first frequency shift to the plurality of signal components; and
 the correlator calculates a first correlation score based on the application of the first frequency shift.

21. The system of claim 20, wherein:
 the frequency shifter applies a second frequency shift to the plurality of signal components; and
 the correlator calculates a second correlation score based on the application of the second frequency shift.

22. The system of claim 18, comprising a buffer for storing a plurality of epochs of signal components.

23. The system of claim 18, comprising a super-sample accumulator configured to store the set of super-samples.

24. The system of claim 23, wherein the set of super-samples formed in the processor is stored in the super-sample accumulator before the correlator calculates a correlation score.

25. The system of claim 19, comprising a super-sample accumulator having a memory location for each epoch position, wherein the super-sample accumulator is configured to store a first epoch of frequency-shifted signal components.

26. The system of claim 25, wherein the processor forms the set of super-samples by combining a second frequency-shifted epoch with the stored first frequency-shifted epoch, wherein the signal components in corresponding epoch positions of the first and second frequency-shifted epochs are combined and stored in the memory location of the super-sample accumulator corresponding to the epoch position.

27. The system of claim 23, wherein the processor forms one of the super-samples in the set of super-samples by:
 selecting an epoch position in the plurality of epochs;
 combining the signal components corresponding to the selected epoch position in the plurality of the epochs; and
 the resulting super-sample is stored in the super-sample accumulator.

28. The system of claim 18, wherein the correlator begins calculation of a correlation score for one super-sample in the set of super-samples, while the processor forms another super-sample in the set of super-samples.

29. The system of claim 18, wherein the correlator is configured to calculate the first correlation score based on a first order of the code components in the identification code, and to calculate a second correlation score based on a second order of the code components in the identification code.

30. The system of claim 18, wherein the correlator is configured to calculate a second correlation score based on a second identification code.

31. The system of claim 18, wherein the correlator calculates the correlation score by, for each super-sample in the set of super-samples, performing at least one of adding the super-sample to and subtracting the super-sample from, the correlation score.

32. The system of claim 31, wherein the correlator determines if the super-sample is added to the correlation score based on the code component in the identification code in a position corresponding to the position of the super-sample in the epoch.

33. The system of claim 31, wherein the correlator determines if the signal component is subtracted from the correlation score based on the code component in the identification code in a position corresponding to the position of the super-sample in the epoch.

34. The system of claim 18, wherein the correlator alters a plurality of super-samples in the set of super-samples of the processor, based on code components in the identification code, having code positions corresponding to the positions of the altered super-samples.

35. The system of claim 34, wherein the correlator calculates the correlation score by adding the altered super-samples together.

36. The system of claim 18, comprising a correlation accumulator for storing a correlation score.

37. The system of claim 36, comprising:
 a super-sample accumulator, configured as one of a circular buffer and a shift register with one epoch of memory locations, to store the set of super-samples; and
 an identification code store, configured as one of a circular buffer and a shift register with one epoch of memory locations, to store an identification code.

38. The system of claim 37, wherein a correlation score is calculated by:
 at least one of adding a first super-sample in a first memory location of the super-sample accumulator to and subtracting a first super-sample in the first memory location of the super-sample accumulator from the correlation score, based on a first code component in a first memory location of the identification code store;

shifting the code components of the identification code to new memory locations, such that the second code component is located in the first memory location;

at least one of adding a second super-sample in the first memory location of the super-sample accumulator to and subtracting a second super-sample in the first memory location of the super-sample accumulator from the correlation score, based on a second code-component in the first memory location of the identification code store.

39. The system of claim 29, comprising a plurality of correlation accumulators for storing a plurality of correlation scores.

40. The system of claim 39, wherein the correlator calculates the first and second correlation scores substantially concurrently and stores the results in a first and a second correlation accumulator of the plurality.

41. The system of claim 39, comprising one of a circular buffer and a shift register for storing the identification code.

42. The system of claim 41, wherein the correlator calculates a plurality of correlation scores substantially concurrently by:
    initializing a first correlation score in each correlation accumulator based on a first selected super-sample and the code components in selected memory locations in the circular buffer;
    shifting the code components to different memory locations in the circular buffer; and
    updating the correlation score in each correlation accumulator based on the initialized correlation score, and a second selected super-sample and the code components in the selected memory locations in the circular buffer.

43. The system of claim 39, comprising a plurality of identification code stores having a memory location for a plurality of the epoch positions for storing at least one of a plurality of orders of the code components of an identification code and a plurality of identification codes.

44. The system of claim 43, wherein there is one correlation accumulator for each of the plurality of identification code stores.

45. The system of claim 39, the plurality of identification code stores includes a number of identification code scores equal to the number of epoch positions.

46. The system of claim 44, wherein the correlator calculates a plurality correlation scores substantially concurrently by:
    initializing a correlation score in each correlation accumulator based on a first selected super-sample and a first code component in a first memory location in each of the corresponding identification code stores;
    shifting the set of super-samples to new memory locations, such that a second super-sample is located in the first memory location;
    shifting the code components of the identification codes to new memory locations, such that a second code component is located in the first memory location in each of the identification code stores;
    updating the correlation score s in each correlation accumulator based on the initialized correlation scores, the second super-sample, and the second code-component in the first memory location in each of the corresponding identification code stores.

47. The system of claim 18, wherein the processor is configured to combine the signal components of the plurality of epochs having a selected epoch position by subtracting at least one of the signal components having the selected epoch position from a sum of signal components having the selected epoch positions in response to determining that a transmitter of the signal has inverted the signal.

48. The system of claim 47, wherein the processor determines that a transmitter has inverted the signal based on system location information known by the system.

* * * * *